United States Patent [19]
Dettmann

[11] Patent Number: 5,975,486
[45] Date of Patent: Nov. 2, 1999

[54] VALVE COMBINATION

[75] Inventor: Heinrich Dettmann, Niedernhall, Germany

[73] Assignee: Bürkert Werke GmbH & Co., Germany

[21] Appl. No.: 09/093,792

[22] Filed: Jun. 9, 1998

[30] Foreign Application Priority Data

Jun. 9, 1997 [DE] Germany .......................... 297 10 023

[51] Int. Cl.⁶ ................................................. F16K 31/40
[52] U.S. Cl. .................................. 251/30.02; 251/149.6; 137/329.4
[58] Field of Search ............................. 251/30.01, 30.02, 251/149.6; 137/329.4

[56] References Cited

U.S. PATENT DOCUMENTS

| 2,412,490 | 12/1946 | Biggle | 251/30.02 X |
|---|---|---|---|
| 2,893,680 | 7/1959 | Freund | 251/30.02 |
| 3,145,967 | 8/1964 | Gardner | 251/5 |
| 3,477,466 | 11/1969 | Sturm | 251/30.02 X |
| 3,913,884 | 10/1975 | Rolfe | 251/30.02 X |
| 4,269,219 | 5/1981 | Dybvig | 251/149.6 X |
| 4,717,116 | 1/1988 | Ishigaki | 251/30.02 |
| 4,796,662 | 1/1989 | Hoffmann et al. | 251/30.02 X |
| 4,981,280 | 1/1991 | Brandenberg | 251/30.02 X |
| 5,074,524 | 12/1991 | Wade | 251/149.6 |
| 5,404,902 | 4/1995 | Wen | 251/30.02 X |
| 5,794,651 | 8/1998 | Miller | 251/30.02 X |

FOREIGN PATENT DOCUMENTS

| 2752901 | 3/1998 | France . | |
|---|---|---|---|
| 1085000 | 7/1960 | Germany | 251/30.02 |
| 1161099 | 1/1964 | Germany . | |
| 3514900 | 11/1986 | Germany . | |
| 1944163 | 8/1996 | Germany . | |
| WO 97/18397 | 3/1997 | WIPO . | |

*Primary Examiner*—Stephen M. Hepperle
*Assistant Examiner*—John Bastianelli
*Attorney, Agent, or Firm*—Sixbey, Friedman, Leedom & Ferguson, PC; Stuart J. Friedman

[57] ABSTRACT

A valve combination is proposed for use in plumbing applications which is suitable as a replacement for conventional solenoid valves with a plunger armature. The valve combination consists of a main valve (10), embodied as a diaphragm valve, a servo valve (14) integrated into a cable connector head (12), and a fluidic coupling (16) between the cable connector head (12) and the main valve (10). The cable connector head (12) is provided with an electrical quick connector (18).

3 Claims, 3 Drawing Sheets

5,975,486

VALVE COMBINATION

FIELD OF THE INVENTION

The invention relates to a valve combination with a servo-controlled main valve and a servo valve.

BACKGROUND OF THE INVENTION

The valves used at present in plumbing applications generally are direct acting solenoid valves with a plunger armature. The functionality of such valves can be impaired by deposits of limescale, iron oxide and other substances, dissolved in the water, between the moving parts, and in particular between the armature and the armature guide tube. Particularly at risk are metallic surfaces subject to high temperatures caused by contact with hot water or by electric power dissipation in the solenoid valves.

Less problematic in this respect are servo-controlled diaphragm valves. No connector technology is available, however, neither on the fluidic nor on the electrical side, for suitable servo valves, in particular flipper valves, which meets the requirements of plumbing applications: The connections must be reliable and easy to install without the need for special tooling, they must be easily dismantled for maintenance purposes, and they must be able to withstand high mechanical stresses.

SUMMARY OF THE INVENTION

The invention provides a valve combination which may be used in place of conventional solenoid valves in plumbing applications, and which makes it possible to establish quickly and easily a reliable connection which will withstand high mechanical stresses, both on the fluidic and on the electrical sides. According to the invention, the servo valve is integrated in a cable connector head which can be fluidic-connected to the main valve. The cable connector head, which is preferentially provided with an electrical quick connector for an electrical cable, makes it possible to establish a problem-free cable connection with traction relief on the electrical side. On the fluidic side, the cable connector head, by means of a fluidic coupling, provides the means for a quick and problem-free connection to the main valve, which is embodied preferentially as a diaphragm valve. In a preferential embodiment, the fluidic coupling is provided with nonreturn valves on the side of the main valve, which are compulsorily opened when the cable connector head is attached. The replacement of the servo valve is therefore possible without any need to dismantle the main valve and without any leakage.

BRIEF DESCRIPTION OF THE DRAWINGS

Further advantages and characteristics of the invention result from the following description of a preferred embodiment, as well as from the drawing, to which reference is made, where.

DETAILED DESCRIPTION OF THE INVENTION

Figure 1:
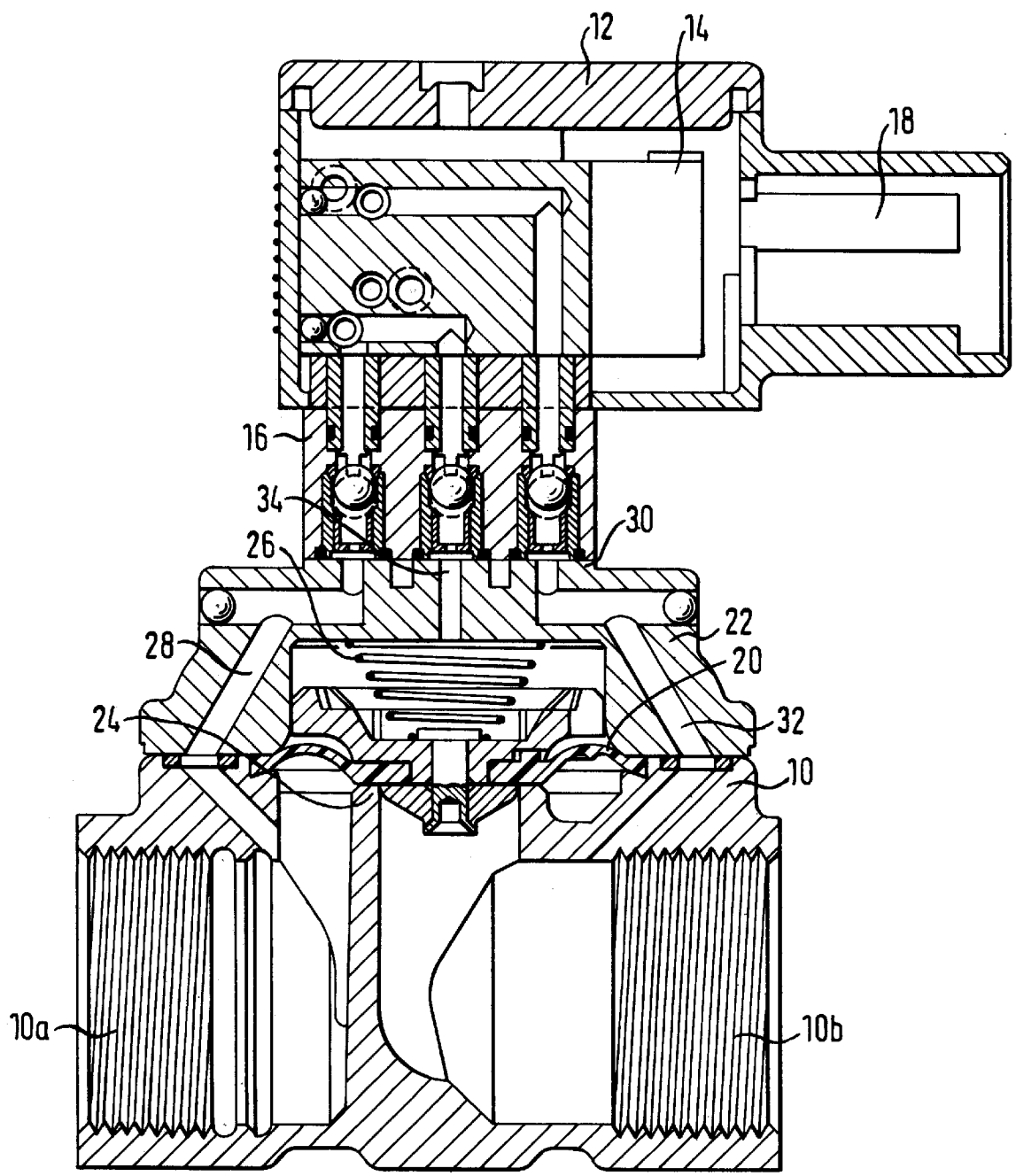
FIG. 1 shows a sectional view of the valve combination.

The valve combination illustrated in FIG. 1 consists of a main valve 10, embodied as a diaphragm valve, a cable connector head 12 complete with integrated servo valve 14, which is embodied as a miniature flipper valve, and a fluidic coupling 16 which connects the main valve 10 to the cable connector head 12. The cable connector head 12 is provided with an electrical quick connector 18. The main valve has two coaxial fluid connections 10a, 10b and a laterally arranged valve chamber with a diaphragm 20 which is clamped at its circumference between a lateral flange of the main valve 10 and a valve cover 22.

The diaphragm 20 acts together with an annular sealing seat 24 against which it is pressed by a compression spring 26. For the servo-control of the main valve 10, a first channel 28 leads from the fluid connection 10a through the valve cover 22 to a connection flange 30 forming part of the cover. A second channel 32 leads from the fluid connection 10b through the valve cover 22 to the connection flange 30. A third channel 34 leads from the space behind the diaphragm 20 to the connection flange 30.

Figure 3:
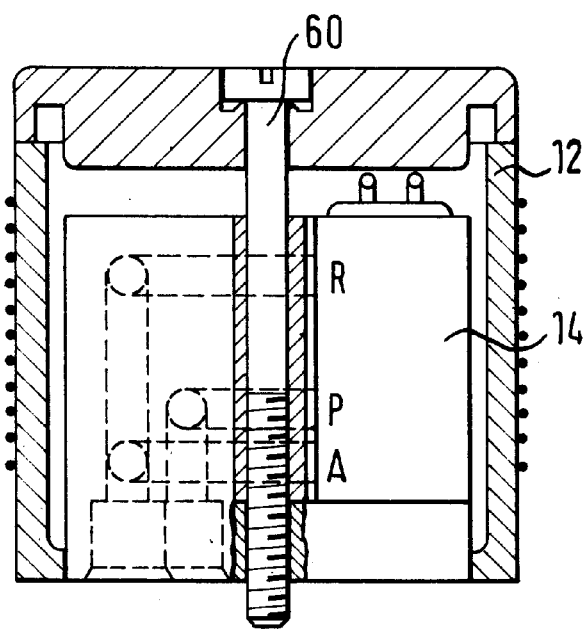
FIG. 3 shows a sectional view along section III—III in FIG. 2.
Figure 4:
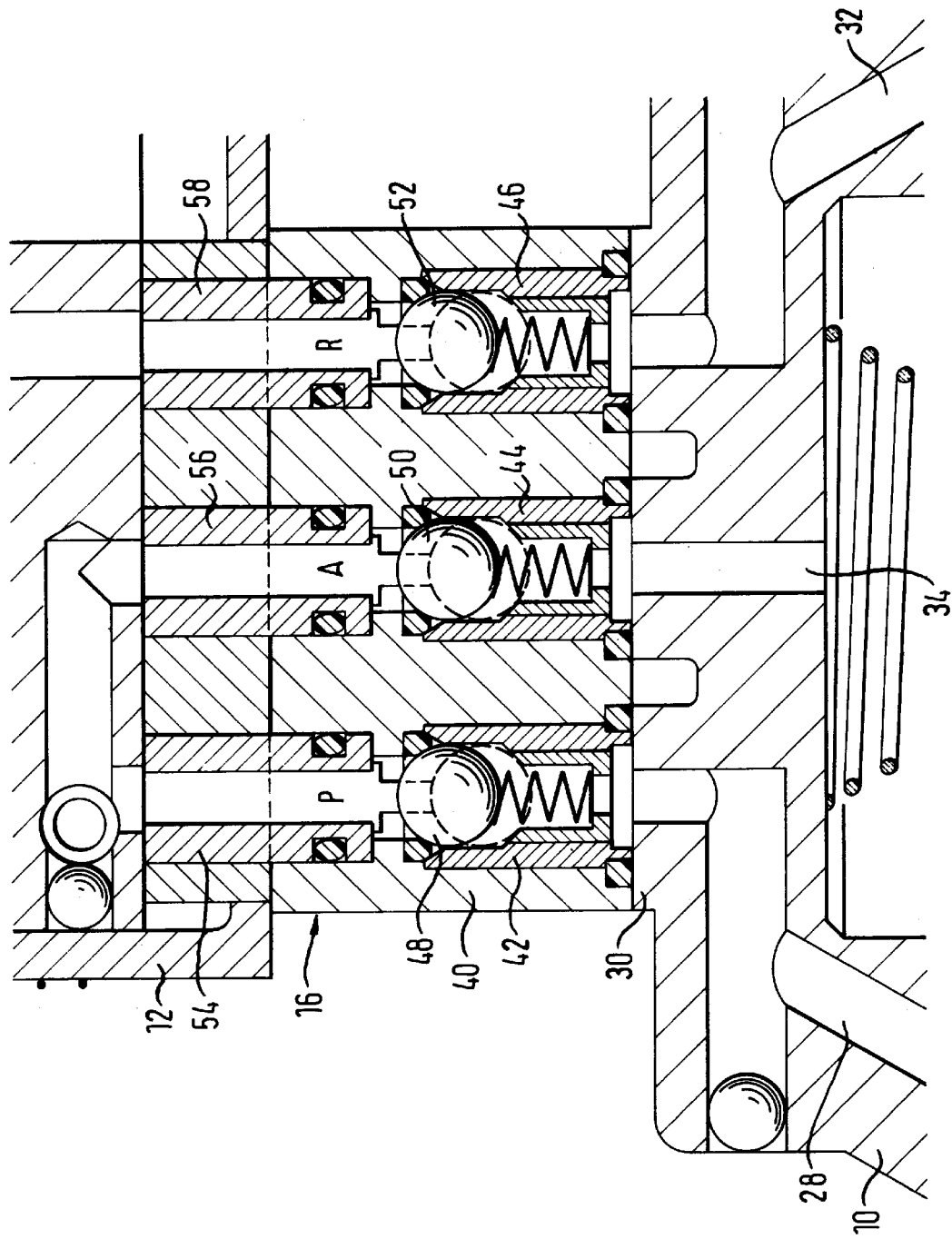
FIG. 4 shows an enlarged partial view from FIG. 1.

The coupling 16, shown enlarged in FIG. 4, consists of an intermediate plate 40, sitting on the connection flange 30, and is provided with three through-connection bores 42, 44, 46 which are in alignment with the port openings of the channels 28, 32 and 34. On the side of the connection flange 30, each end of the connection bores 42, 44, 46 is sealed by means of an annular seal against the flange 30. Furthermore, on the side of the connection flange 30, a nonreturn valve is inserted into each of the connection bores 42, 44, 46, which is provided with spring-loaded balls 48, 50, 52 abutting against an annular seal. A sealing pipe nipple 54, 56, 58 provided with an annular seal is inserted into each of the ends of the connection bores 42, 44, 46, on the side of the cable connector head. These pipe nipples 54, 56, 58 lead out of the housing of the cable connector head 12. At their free ends they are provided with actuating rods which lift the balls 48, 50 or 52, respectively, from their corresponding annular seals when the cable connector head 12 is seated flush on the intermediate plate 40. This forced open condition of the nonreturn valves is illustrated in FIG. 4 by the broken line in the balls 48, 50, 52. The cable connector head 12 is fastened to the intermediate plate 40 by means of a bolt 60, passing through the connector housing, as shown in FIG. 3.

Figure 2:
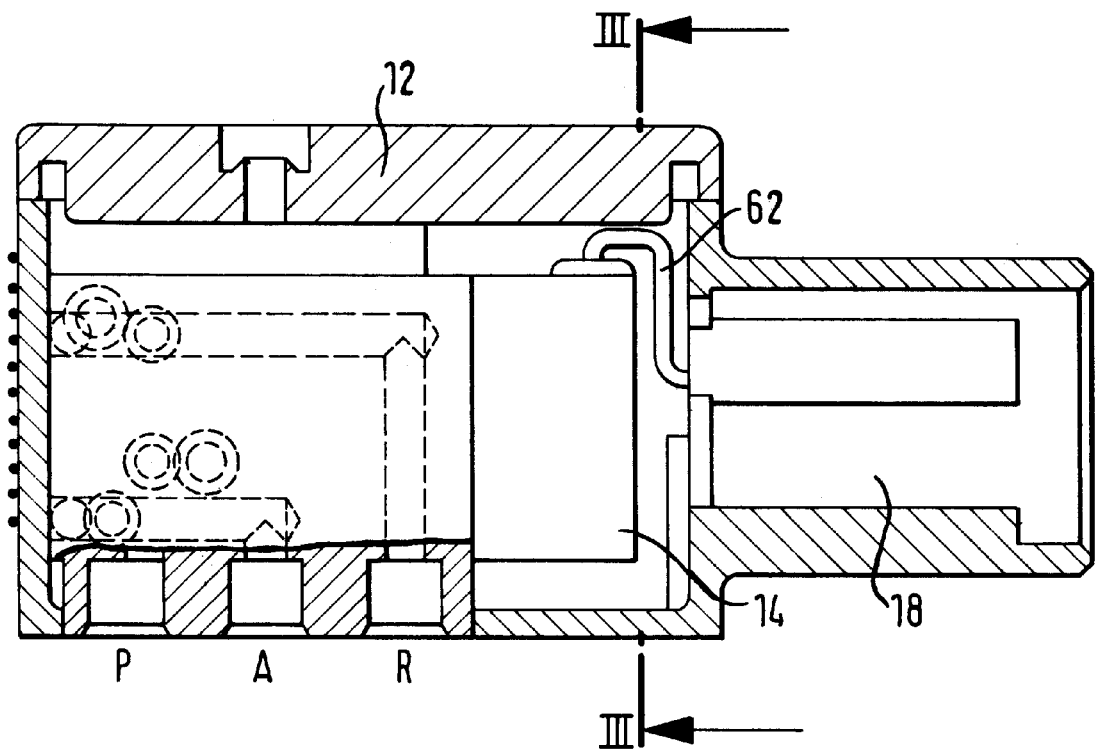
FIG. 2 shows an enlarged sectional view of the cable connector head with integrated servo valve.

The servo valve 14 is a conventional 3/2-way valve. Because it is a miniature version, such a valve has relatively delicate electrical multiple conductor connection leads 62 (FIG. 2). These are connected to the electrical quick connector 18 inside the cable connector head 12, and therefore well protected. Since the servo valve 14 may be embodied as a conventional 3/2-way valve, a detailed description is superfluous. FIG. 2 represents the cable connector head 12 when it is detached from the main valve 10. In this condition, the servo valve 14 can be used as a direct-acting miniature valve. To this purpose, the fluidic connections to the outside, P A R, are provided where the pipe nipples 54, 56, 58 can be inserted. Even without these pipe nipples, the cable connector head 12 may be attached with its fluidic connection surface to a suitably shaped counter flange.

In the embodiments shown, the connection configurations of the fluidic coupling are identical on both sides. With different connection configurations between the cable connector head 12 and the main valve 10, the systems can be adapted to each other by means of the fluidic coupling 16.

The main valve 10, embodied as a diaphragm valve, is immune against deposits of limescale, iron oxide or other substances dissolved in the water. The actuation of the main valve 10 is achieved by means of the servo valve 14 via the channels 28, 32 and 34 in the conventional way. This means not only a low electrical control power, but also ensures a particularly reliable function of the main valve. By the use of the fluidic coupling 16 with integrated nonreturn valves, the connection procedure of the servo valve 14 is reduced to the insertion of the pipe nipples into the connection bores, after which the bolt 60 is tightened to secure the cable connector head 12 to the intermediate plate 40 and, consequently, to the main valve 10. The fluidic coupling can withstand high mechanical stresses. Furthermore, the cable connector head 12, together with the servo valve 14, can be detached from the main valve 10 without any leakage of fluid, since the nonreturn valves close automatically as soon as the pipe nipples are withdrawn from the connection bores.

The quick connector 18 used for the electrical connection of the servo valve 14 finally ensures the easy connection of a cable without the need for tools, and also provides traction relief.

I claim:

1. A valve combination comprising a servo-controlled main valve, a solenoid-controlled servo valve and a cable connector head, said servo valve being integrated into said cable connector head, and said cable connector head providing an electric interface for connection of an electric cable to said solenoid and a fluid interface for fluidic connection to said main valve, wherein said fluid interface comprises an intermediate plate which provides a coupling between the differing connection configurations of said cable connector head and said main valve, said intermediate plate including a plurality of connection bores into each of which a respective pipe nipple protruding from said cable connector head is insertable.

2. Valve combination according to claim 1, wherein a nonreturn valve is provided in each of said connection bores on the side of said main valve.

3. Valve combination according to claim 1, wherein said nonreturn valves are compulsorily opened when said pipe nipples are inserted into said connection bores.

* * * * *